United States Patent
Lindèn et al.

(10) Patent No.: US 6,789,324 B2
(45) Date of Patent: Sep. 14, 2004

(54) DOUBLE GEAR HEDGE SHEARS

(75) Inventors: Olavi Lindèn, Billnäs (FI); Markus Paloheimo, Billnäs (FI)

(73) Assignee: Fiskars Consumer Oy OB, Villnas (FI)

( * ) Notice: Subject to any disclaimer, the term of this patent is extended or adjusted under 35 U.S.C. 154(b) by 411 days.

(21) Appl. No.: 09/849,760

(22) Filed: May 4, 2001

(65) Prior Publication Data

US 2003/0140501 A1 Jul. 31, 2003

Related U.S. Application Data

(60) Provisional application No. 60/203,653, filed on May 12, 2000, now abandoned.

(51) Int. Cl.[7] .............................................. B26B 13/00
(52) U.S. Cl. ............................ 30/245; 30/250; 30/254; 30/341; 30/192
(58) Field of Search ......................... 30/192, 211, 244, 30/245, 250, 252, 254, 341, 342, 351; 81/359, 360, 364, 366, 348; 7/129–134

(56) References Cited

U.S. PATENT DOCUMENTS

| 107,577 | A | | 9/1870 | Will | |
|---|---|---|---|---|---|
| 157,610 | A | * | 12/1874 | King | 30/192 |
| 476,459 | A | * | 6/1892 | Hamann et al. | 30/252 |
| 573,548 | A | * | 12/1896 | Sours | 30/192 |
| 640,257 | A | * | 1/1900 | Baer | 30/252 |
| 863,111 | A | | 8/1907 | Smohl | |
| 1,455,297 | A | * | 5/1923 | Lyons et al. | 30/192 |
| 1,689,648 | A | | 10/1928 | Voleske | |
| 1,915,404 | A | | 6/1933 | Clifton | |
| 3,325,896 | A | | 6/1967 | G.D'Angelo et al. | |
| 4,130,938 | A | | 12/1978 | Uhlmann | |
| 4,677,748 | A | * | 7/1987 | Kobayashi | 30/250 |
| 5,020,222 | A | | 6/1991 | Gosselin et al. | |
| 5,176,049 | A | * | 1/1993 | Neff | 81/360 |
| D367,410 | S | | 2/1996 | Hortnagl | |
| D367,594 | S | | 3/1996 | Hortnagl | |
| 5,570,510 | A | | 11/1996 | Lindèn | |
| 5,689,888 | A | | 11/1997 | Lindèn | |
| D397,021 | S | | 8/1998 | Hörtnagl | |

FOREIGN PATENT DOCUMENTS

| DE | 40 23 559 C2 | 1/1992 |
|---|---|---|
| EP | 0 824 999 A2 | 2/1998 |
| FR | 488129 | 12/1917 |
| KR | 110-140 | 1/1999 |
| TW | 382194 | 2/0000 |
| TW | 830284 | 9/1994 |

* cited by examiner

*Primary Examiner*—Boyer D. Ashley
(74) *Attorney, Agent, or Firm*—Foley & Lardner LLP

(57) ABSTRACT

A hedge having two opposing cutting blades connected to handles. Both of the cutting blades and both of the handles have gear elements formed as part of the blade or handle. The gear element of one handle engages the gear element of one of the cutting blades, while the gear element of the other handle engages the gear element of the other cutting blade so that a variable force is provided throughout the cutting stroke.

20 Claims, 4 Drawing Sheets

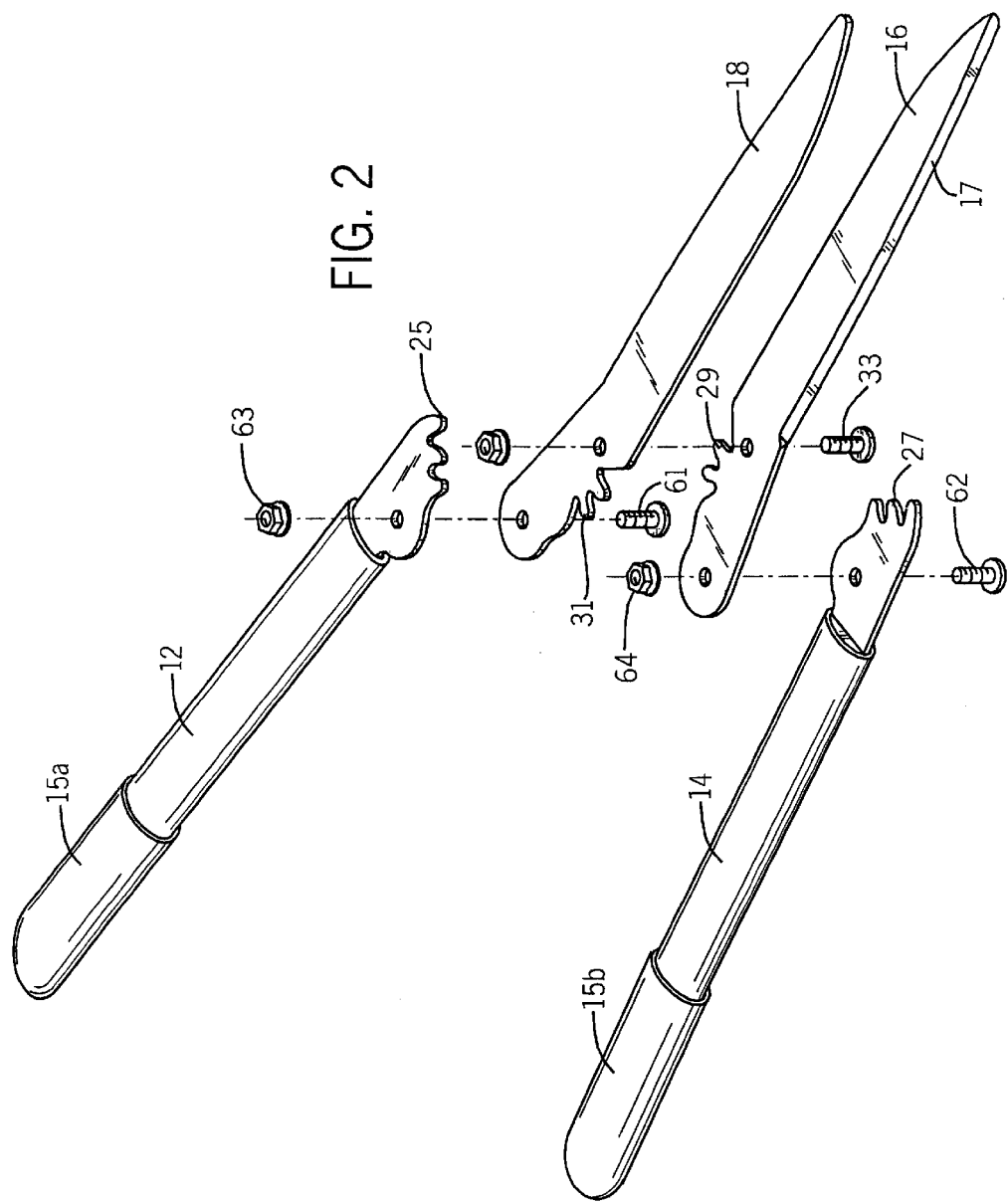

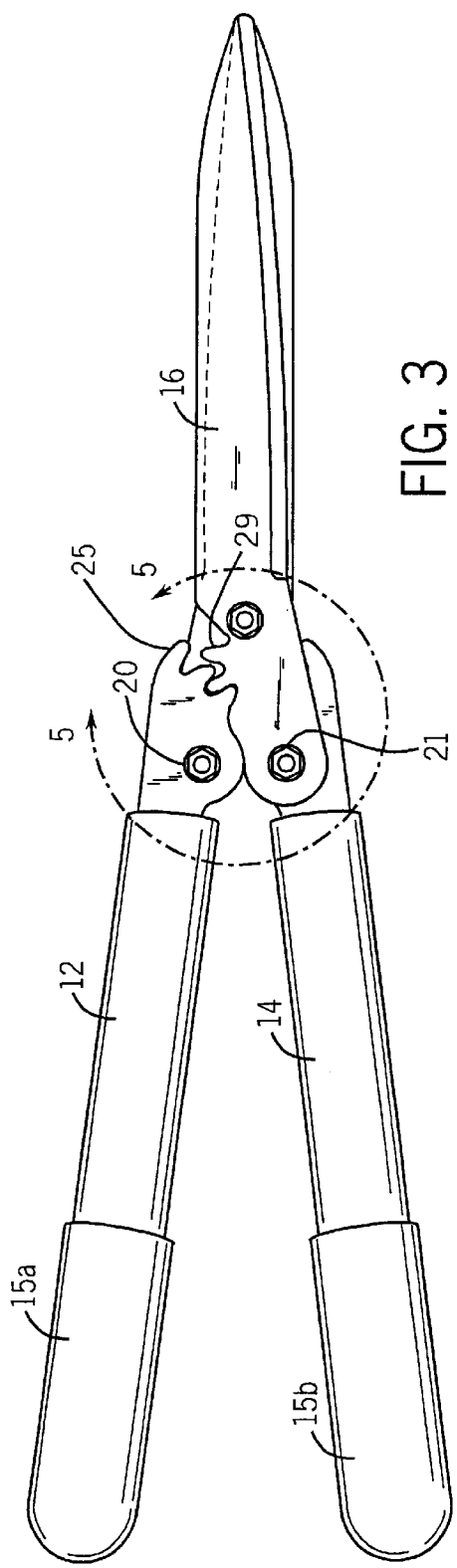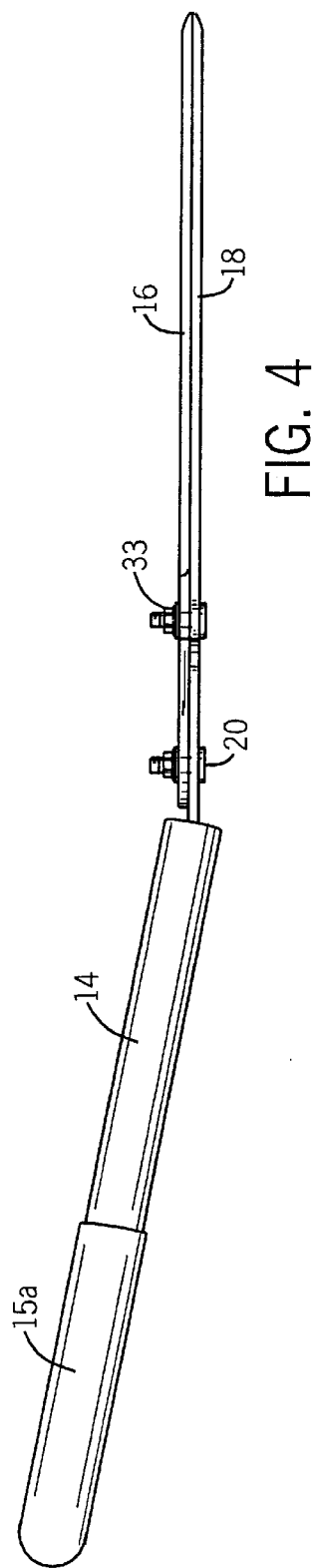
FIG. 3
FIG. 4

DOUBLE GEAR HEDGE SHEARS

RELATED APPLICATIONS

This application claims the benefit of U.S. Provisional Application No. 60/203,653, filed May 12, 2000, now abandoned, the entire disclosure of which is included herein by reference.

FIELD OF THE INVENTION

This application relates to double gear hedge shears. More particularly, it relates to a hedge shear that uses gears between the handles and the blades to improve cutting efficiency.

BACKGROUND OF THE INVENTION

In the cutting process using traditional hedge shears, branches are collected within the sector covered by the cutting blades at the beginning of the cutting stroke. As the cut proceeds, most of the branches are cut using the outermost parts of the blades. This is a disadvantage, because the force there is at its lowest. Thus, the user of typical hedge shears must apply additional effort to cut branches at the outermost points, resulting in increased strain on the user and inefficiency in the cutting operation.

In most known devices, the force available for cutting remains constant throughout the cutting process. As a result, the amount of output force used when cutting branches is the same as when collecting the branches in the initial stages of the cut. Since collecting the branches requires less force than cutting the branches, a constant output force results in additional inefficiency in the cutting operation.

Gear and linkage systems are widely used in different kinds of cutters. The purpose of these systems is to increase cutting force. This usually also results in increased movement of the handles, which forces the user to extend further than would normally be the case.

The use of gears in hedge shears is known in the art. For example, Gardena sells a geared model which is said to increase the cutting force by 35%. While the Gardena system does increase cutting force, it suffers from a deficiency in that the cutting force remains constant through the cutting process, resulting in the inefficiency described above. In contrast, an efficient pair of hedge shears would perform the collecting stage of the cutting process quickly and with minimum power, while reserving most of the force and handle movement for the cutting stage.

Progressive cutting force systems are also known. Fiskars, the assignee of this application, has U.S. Pat. No. 5,689,888 on such a variable force tool. The gearing is constructed so that there is the greatest force in use when actually needed: in the middle of the branch. This tool makes use of a planetary gear mechanism is ideally suited to cutters where the movement of the handles and blades is asymmetrical. Using such a mechanism with hedge shears is problematic, however, since typically the movement of the blades and handles is symmetrical. Additionally, since head shears generally have symmetrical movement of parts, the parts themselves used to make the shears can be made symmetrical. Fabrication of hedge shears in this manner reduces the manufacturing cost of the shears, since the entire product can be made using only one mold for the blades and one mold for the handles.

Accordingly, there is a need to provide a hedge shear in which the cutting force ratio varies throughout the cut, with the greatest force reserved for the cutting action. Further, there is a need to provide a hedge shear in which the cutting force ratio varies throughout the cut, and where the blades and handles of the hedge shear are symmetrical.

SUMMARY OF THE PRESENT INVENTION

The present invention relates to a cutting tool. The cutting tool includes a first handle having a first gear element and a second handle having a second gear element. The cutting tool also includes a first cutting blade having a third gear element and a second cutting blade having a fourth gear element. The first cutting blade is connected to the first handle, and the second cutting blade is connected to the second handle. The first gear element engages the fourth gear element and the second gear element engages the third gear element.

The present invention also relates to a hedge shear having improved cutting ability. The hedge shear includes a first cutting element, which includes a first handle, a first blade, a first handle gear, and a first blade gear. The hedge shear also includes a second cutting element, which includes a second handle, a second blade, a second handle gear, and a second blade gear. The hedge shear also includes a connector for pivotably connecting the first and second cutting elements such that the first handle gear engages the second blade gear and the second handle gear engages the first blade gear.

The present invention also relates to a cutting tool having two sets of meshing gears for generating increased output force. The cutting tool includes first and second handles, where the first handle includes a first handle gear and the second handle includes a second handle gear. The cutting tool also has first and second blades, where the first blade includes a first blade gear and the second blade includes a second blade gear. The first and second handle gears and first and second blade gears are symmetrical. The cutting tool also includes means for attaching the first handle to the first blade and the second handle to the second blade and means for pivotably connecting the first blade to the second blade. The first handle gear meshes with the second blade gear and the second handle gear meshes with the first blade gear to increase the cutting force as the first and second blades are moved to a closed position.

BRIEF DESCRIPTION OF THE DRAWINGS

FIG. 2 is an exploded perspective view of the invention shown in FIG. 1;

FIG. 3 is a top view of the invention shown in FIG. 1 with the blades and handles in the closed position;

FIG. 4 is a side view of the invention shown in FIG. 1;

Figure 1:
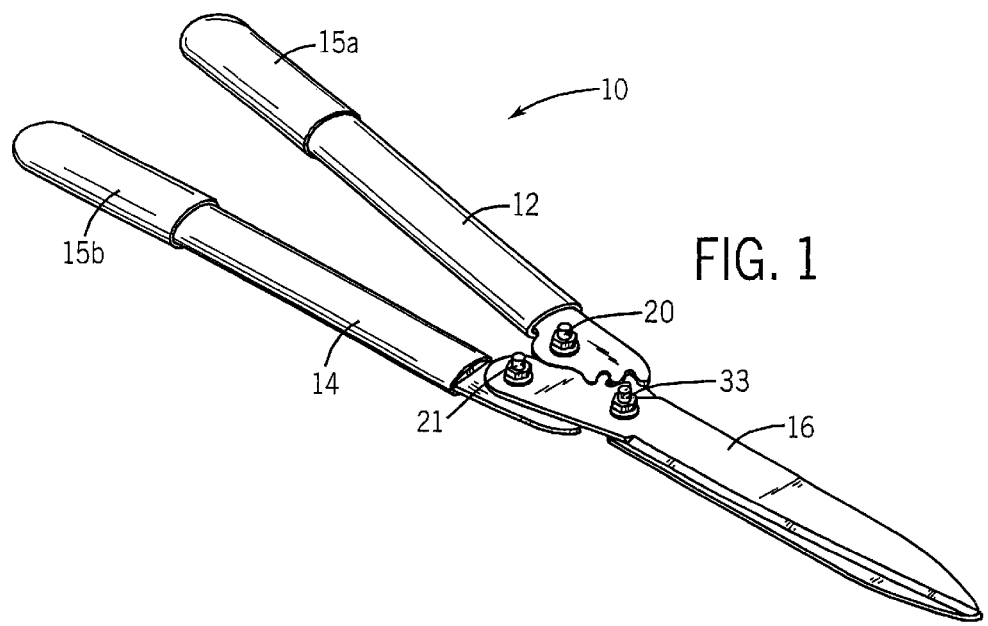
FIG. 1 is a perspective view of a preferred embodiment of the invention.

Before explaining at least one preferred embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to the figures, a cutting tool in the form of a hedge shear 10 is shown. Hedge shear 10 includes handles 12 and 14. Handles 12 and 14 are generally straight, elongated members and may be formed from steel, plastic, aluminum, or any other suitable material as is well known in the art. Additionally, handle 12 includes gripping portion 15a and handle 14 includes gripping portion 15b. In a preferred embodiment, gripping portions 15a, 15b are made of rubber material ideally suited to provide increased grip for a user of the hedge shear 10. These gripping portions can be placed on the end of handles 12 and 14 or can be integrally formed with the handles. Alternatively, the entire handles 12 and 14, including gripping portions 15a and 15b, can be made of the same material. In this alternative embodiment, the surface of the handle forming the gripping portion can include raised ribs or dots to further enhance the user's grip on the hedge shear 10.

Hedge shear 10 also includes cutting blades 16 and 18. Blades 16 and 18 have cutting edges 17 and 19, respectively. Cutting edges 17 and 19 have opposable faces, such that when the blades 16 and 18 are brought together to cut vegetation or other material, cutting edges 17 and 19 act to shear the object being cut. Blades 16 and 18 are preferably formed from steel or aluminum, but may also be formed from other materials as are well known in the art.

As shown particularly in FIG. 2, blade 16 is connected to handle 14, and blade 18 is connected to handle 12. The result is the formation of two separate cutting elements 40 and 50 in which cutting element 40 includes handle 12 and blade 18, and cutting element 50 includes handle 14 and blade 16. In a preferred embodiment, fasteners 20, 21 are used to pivotably connect the handles and blades. In a preferred embodiment, fasteners 20, 21 include a pivot pin with a nut attached to allow twisting motion at the location of the fastener. Alternatively, fasteners 20, 21 can be any other type of fastener which allows rotation about the fastener.

Figure 5:
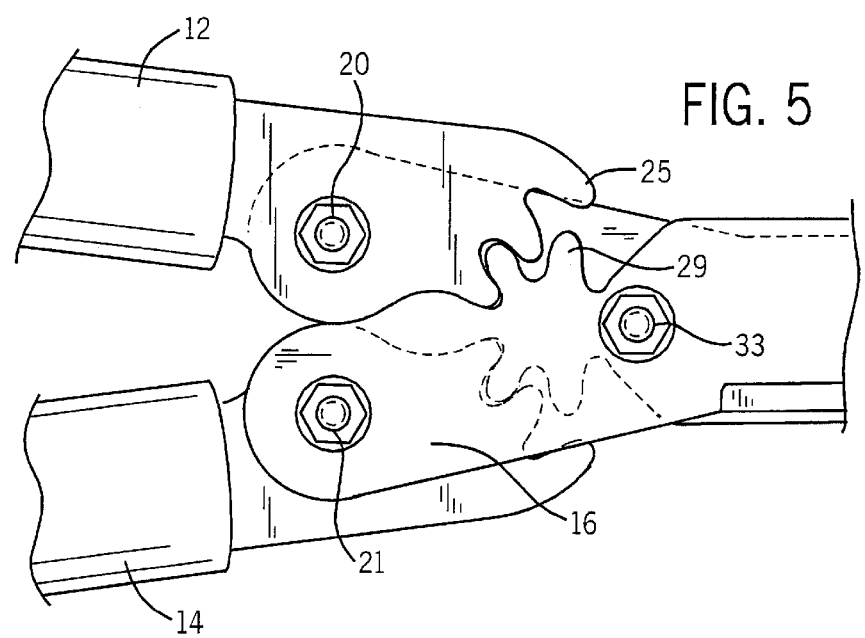
FIG. 5 is an enlarged top view of gear portions of the invention shown in FIG. 1 taken along line 5—5 in FIG. 3.

As shown clearly in FIGS. 2 and 5, handle 12 includes gear elements or segments 25 and handle 14 includes gear elements or segments 27 on one end of the handle. Blades 16 has gear elements or segments 29 and blade 18 has gear elements or segments 31 formed as part of the blade. In using the hedge shears 10, the blade gear of one cutting element will engage the blade gear of the other cutting element. As illustrated most clearly in FIG. 6, when assembled, handle gear 25 on handle 12 engages blade gear 29 on blade 16, while handle gear 27 on handle 14 engages blade gear 31 on blade 18.

In a preferred form of the invention, handles 12 and 14, including the handle gears 25 and 27, are identical in shape. Similarly, in a preferred form of the invention, the cutting blades 16 and 18 and their associated blade gears 29 and 31 are also identical in shape. This symmetry of parts enables a manufacturer to cost-effectively produce hedge shears by reducing the number of different parts that must be separately formed in the manufacturing process. Since the blades and handles are identical, only one mold or other forming process for each of the components must be used to produce the necessary parts.

Figure 6:
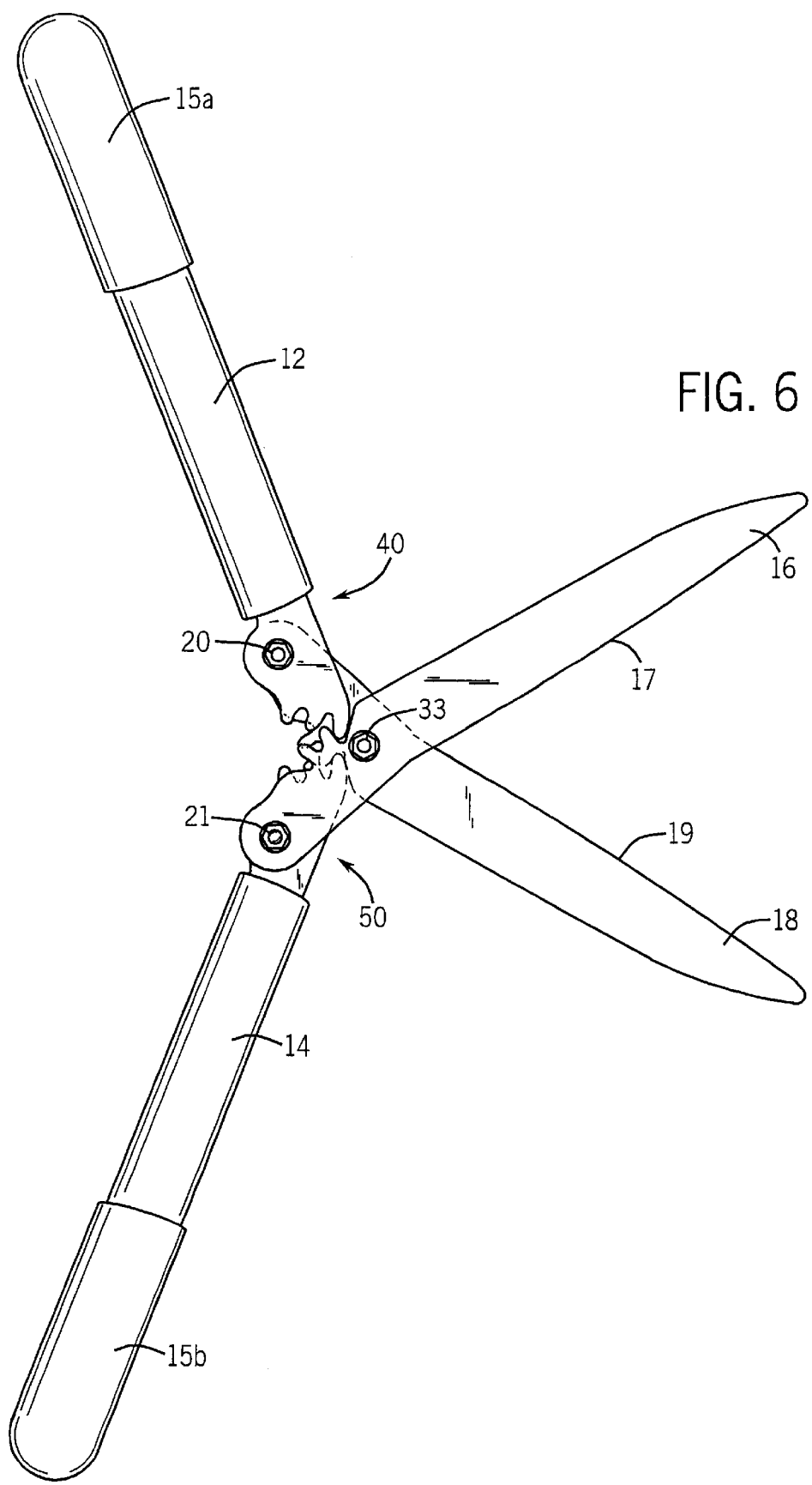
FIG. 6 is a top view of the invention shown in FIG. 1 with blades and handles in the open position.

FIG. 3 shows the hedge shear 10 in the closed position, while FIG. 6 shows the hedge shear in the open position. As the handles are moved from the closed position of FIG. 3 to the open position of FIG. 6, handle gear 25 and blade gear 29 engage and cause the blades 16 and 18 to move apart. A pivot pin 33 acts as a pivot point about which the cutting elements 40 and 50 rotate. Thus, as the head shears are opened, the handles and blades will pivot about fasteners 20 21 and the blades will pivot about pivot pin 33. Pivot pin 33 can be a typical straight shaft pivot pin secured by a nut or any other type of fastener that allows cutting elements 40 and 50 to rotate about a fixed point. Additionally, pivot pin 33 can be coated with grease or any other lubricant to reduce the friction involved in opening and closing the hedge shears 10.

The geometry of the handle gears 25 and 27 and blade gears 29 and 31 is selected to result in an increase in the output force generated during the cutting motion. In a preferred embodiment, handle gears 25 and 27 and blade gears 29 and 31 are formed to resemble a series of rounded and elongated teeth or fingers. Other configurations are also possible, and will yield similar results. For example, the teeth in an alternative embodiment could be widened or lengthened to alter the performance of the hedge shears. In a preferred embodiment illustrated in FIG. 5, the handle gears include teeth portions which increase in length toward the outside of the hedge shears. The blade gears have an opposite geometry which allows the teeth of the handle gears to mate with the blade gears.

As the handles 12 and 14 are moved from the open position of FIG. 6 to the closed position of FIG. 3, the force exerted by the cutting portion of the blades will vary as a result of the gear configurations. Thus, in the beginning stages of the cut, in which the branches or other objects are being gathered within the cutting range of the hedge shears, the cutting force ratio approximately a 1:1. As the cut proceeds, the cutting force ratio increases in relation to the input force, with maximum cutting force achieved as the ends of blades 16 and 18 come together. In a preferred embodiment, a cutting force ratio of at least 2:1 can be achieved in this manner. In yet another preferred embodiment, a cutting force ratio of approximately 3:1 can be achieved in this manner. The use of hedge shears in accordance with the present invention thus requires less effort by the user, since the maximum amount of force is reserved for the latter stages of the cut, when the branches or other material are actually being severed by the shears. This in turn results in less strain on the user, who may then operate faster and more efficiently. Additionally, the increased cutting force allows a user to cut using the outermost portion of the blades, where the cutting force is generally the weakest.

Thus, it should be apparent that there has been provided in accordance with the present invention a double gear hedge shears that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A cutting tool having two sets of meshing gears for generating increased output force, the cutting tool comprising:

first and second handles, the first handle including a first handle gear and the second handle including a second handle gear, wherein the first and second handle gears are symmetrical;

first and second blades, the first blade including a first blade gear and the second blade including a second blade gear, wherein the first and second blade gears are symmetrical;

means for attaching the first handle to the first blade and the second handle to the second blade; and means for pivotably connecting the first blade to the second blade;

wherein the first handle gear meshes with the second blade gear and the second handle gear meshes with the first blade gear such that the cutting force increases as the first and second blades are moved to a closed position;

wherein the first and second handle gears include a plurality of teeth and the outermost tooth is longer than the innermost tooth.

2. A cutting tool, comprising:

a first handle having a first gear element;

a second handle having a second gear element;

a first cutting blade having a third gear element and connected to the first handle; and a second cutting blade having a fourth gear element and connected to the second handle;

wherein the first gear element engages the fourth gear element and the second gear element engages the third gear element.

wherein at least one of the gear elements includes a plurality of teeth that vary in length to provide a cutting force ratio that varies during a cutting stroke.

3. The cutting tool of claim 2, wherein the first and second gear elements are integrally formed as part of the first and second handles.

4. The cutting tool of claim 2, wherein the third and fourth gear elements are integrally formed as part of the third and fourth cutting blades.

5. The cutting tool of claim 2, wherein a plurality of the gear elements include a plurality of teeth that vary in length to provide a cutting force ratio which varies during the cutting stroke as the blade are moved from an open position to a closed position.

6. The cutting tool of claim 2, wherein the first and second handles are identical in shape.

7. The cutting tool of claim 2, wherein the first and second cutting blades are identical in shape.

8. A hedge shear having improved cutting ability, comprising:

a first cutting element including a first handle, a first blade, a first handle gear, and a first blade gear;

a second cutting element including a second handle, a second blade, a second handle gear, and a second blade gear;

a connector for pivotably connecting the first and second cutting elements, such that the first handle gear engages the second blade gear and the second handle gear engages the first blade gear.

wherein a plurality of the gears each include a plurality of teeth that differ in shape to provide a varying cutting force ratio as the first blade and second blade are moved toward each other.

9. The hedge shear of claim 8, wherein the first handle gear is integrally formed as part of the first handle and the second handle gear is integrally formed as part of the second handle.

10. The hedge shear of claim 8, wherein the first blade gear is integrally formed as part of the first blade and the second blade gear is integrally formed as part of the second blade.

11. The hedge shear of claim 8, wherein the first handle has a shape identical to that of the second handle, and the first handle gear has a shape identical to that of the second handle gear.

12. The hedge shear of claim 8, wherein the first blade has a shape identical to that of the second blade, and the first blade gear has a shape identical to that of the second blade gear.

13. The hedge shear of claim 8, further comprising means for coupling the first handle to the first blade and the second handle to the second blade.

14. The hedge shear of claim 8, wherein the engagement of the gears provides a cutting force ratio which varies during the cutting stroke as the first and second cutting elements are moved from an open position to a closed position.

15. The hedge shear of claim 14, wherein the cutting force ratio is at least 2:1.

16. A cutting tool having two sets of meshing gears for generating increased output force, the cutting tool comprising:

first and second handles, the first handle including a first handle gear and the second handle including a second handle gear, wherein the first and second handle gears are symmetrical and wherein the first handle gear and the second handle gear each include a plurality of teeth, at least one of the plurality of teeth having a first shape and at least one of the plurality of teeth having a second shape different from the first shape;

first and second blades, the first blade including a first blade gear and the second blade including a second blade gear, wherein the first and second blade gears are symmetrical;

means for attaching the first handle to the first blade and the second handle to the second blade; and means for pivotably connecting the first blade to the second blade;

wherein the first handle gear meshes with the second blade gear and the second handle gear meshes with the first blade gear such that the cutting force increases as the first and second blades are moved to a closed position.

17. The cutting tool of claim 16, wherein the first and second handle gears are integrally formed as part of the first and second handles.

18. The cutting tool of claim 16, wherein the first and second blade gears are integrally formed as part of the first and second blades.

19. The cutting tool of claim 16, wherein the meshing of the gears causes the ratio of output force to input force to increase as the first and second blades are moved from an open position to a closed position.

20. The cutting tool of claim 19, wherein the ratio of output force to input force as the first and second blade approach the closed position is at least 2:1.

* * * * *

UNITED STATES PATENT AND TRADEMARK OFFICE
CERTIFICATE OF CORRECTION

PATENT NO. : 6,789,324 B2 Page 1 of 1
DATED : September 14, 2004
INVENTOR(S) : Olavi Lindèn and Markus Paloheimo It is certified that error appears in the above-identified patent and that said Letters Patent is hereby corrected as shown below:

<u>Column 5,</u>
Line 37, delete "blade" and substitute -- blades --.
Line 53, following "gear" delete "." and substitute -- ; --.

Signed and Sealed this

Twenty-third Day of November, 2004

JON W. DUDAS
*Director of the United States Patent and Trademark Office*